(12) United States Patent
Fujita et al.

(10) Patent No.: US 8,189,040 B2
(45) Date of Patent: May 29, 2012

(54) RECIPE GENERATION SYSTEM AND METHOD

(75) Inventors: Hiromi Fujita, Mito (JP); Hitoshi Komuro, Hitachinaka (JP); Toshikazu Kawahara, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 967 days.

(21) Appl. No.: 12/181,764

(22) Filed: Jul. 29, 2008

(65) Prior Publication Data

US 2009/0062934 A1 Mar. 5, 2009

(30) Foreign Application Priority Data

Jul. 31, 2007 (JP) .................................. 2007-199428

(51) Int. Cl.
 *H04N 7/18* (2006.01)
 *G06F 17/50* (2006.01)
(52) U.S. Cl. .......................................... 348/61; 716/50
(58) Field of Classification Search ................... 348/61; 716/50
See application file for complete search history.

(56) References Cited

U.S. PATENT DOCUMENTS

| 7,365,322 | B2 | 4/2008 | Miyamoto et al. |
| 2006/0288325 | A1 | 12/2006 | Miyamoto et al. |
| 2007/0210252 | A1* | 9/2007 | Miyamoto et al. ............ 250/310 |

FOREIGN PATENT DOCUMENTS

| JP | 2006-351746 A | 12/2006 |
| JP | 2007-3212 A | 1/2007 |

* cited by examiner

*Primary Examiner* — Jerry Dennison
(74) *Attorney, Agent, or Firm* — Crowell & Moring LLP

(57) ABSTRACT

There is provided a recipe generation apparatus and method for reducing the time required to reflect an optimal value and changed value in an input file by automatically reflecting a value obtained by optimizing an input file for recipe generation in the input file for recipe generation. This invention eliminates the inconvenience of manually reflecting changes in an input file for recipe generation by automatically reflecting changed values in the input file for recipe generation after editing a provisionally generated off-line recipe and achieves a reduction in processing time. This invention also provides a method for automatically generating an off-line recipe and a file for recipe generation from a recipe of a scanning electron microscope (see FIG. 3).

20 Claims, 7 Drawing Sheets

RECIPE GENERATION SYSTEM AND METHOD

BACKGROUND OF THE INVENTION

1. Field of the Invention

The present invention relates to a recipe generation system and a recipe generation method and, for example, to an application for generating a recipe of a scanning electron microscope off-line using design data.

2. Background Art

A file called a recipe which has alignment point information (an alignment chip, in-chip coordinates, alignment conditions, an image for automatic detection, and the like) and length measurement point information (a length measurement chip, in-chip coordinates, length measurement conditions, an image for automatic length measurement, and the like) recorded therein is required for length measurement using a CD-SEM (Critical Dimension Scanning Electron Microscope). This recipe needs to be generated for each of captured images necessary for length measurement.

Since the process of generating such a recipe using scanning electron microscope instrumentation while actually viewing a SEM image reduces the operating rate of the instrumentation, there is a strong need for generating a recipe off-line. There have been developed off-line recipe generation systems for generating a recipe of a CD-SEM off-line to meet the need. Off-line recipe generation methods are said to fall roughly into two types: those involving input of values on a screen (Method 1) and those using an input file for recipe generation including values (Method 2).

A method involving input of values on a screen (Method 1) is a method for generating a recipe of a CD-SEM by inputting values, such as coordinate values to be measured by the CD-SEM and imaging conditions, necessary for the recipe on a GUI. A method using an input file (Method 2) is a method for generating a recipe using an input file for off-line recipe generation and design data as input data. For example, assume that thousands of captured images are necessary. In this case, since manual setting of a recipe on a GUI by Method 1 takes time, recipe generation by Method 2 is more efficient.

Examples of Method 2 described above include the process of simply converting values set in an input file for off-line recipe generation by a user into a recipe without change and the process of optimizing values of information on an alignment point and information on a length measurement point and outputting the optimized values to a recipe. A recipe generated by any of the above-described methods can be displayed on a GUI and can be changed. It is also possible to change alignment information and measurement point information after making a recipe actually work on a CD-SEM. A recipe regenerated in such a manner is a high-precision recipe which has undergone optimization processing and has been user-modified. There is a user need for making a copy of this recipe and using the copy when generating another recipe.

Patent Document 1: JP Patent Publication (Kokai) No. 2007-3212 A (corresponding to U.S. Pat. No. 7,365,322)

Patent Document 2: JP Patent Publication (Kokai) No. 2006-351746 A (corresponding to US 2006/0288325)

SUMMARY OF THE INVENTION

However, in a generated recipe, an optimized value or a value changed by a user may be different from a corresponding value of an input file for off-line recipe generation. If changed values are different from corresponding values of an input file for off-line recipe generation, a conventional method requires a user to manually input the changed values in the input file one by one to generate a recipe identical to a high-precision recipe. In this case, optimization of the input file takes much time.

Additionally, if a large number of values are changed, a user who tries to reflect all of the changed values may omit some of them. Moreover, in a situation where an optimized or modified value cannot be easily reflected in an input file for recipe generation, optimization and modification take extra time even if optimized and modified values already obtained at the time of recipe generation are reused.

The present invention has been made in consideration of the above-described circumstances, and has as its object to provide a recipe generation apparatus and method for automatically reflecting, in an input file for recipe generation, a value obtained by optimizing the input file for recipe generation and thereby reducing the time required to reflect optimal and changed values in the input file.

In order to solve the above-described problems, the present invention eliminates the inconvenience of manually reflecting changes in an input file for recipe generation by automatically reflecting changed values in the input file for recipe generation after editing a provisionally generated off-line recipe and achieves a reduction in processing time. The present invention also provides a method for automatically generating an off-line recipe and a file for recipe generation from a recipe of a scanning electron microscope.

More specifically, according to the present invention, there is provided a recipe generation system for generating a recipe of a critical dimension SEM off-line using an input file for off-line recipe generation for the critical dimension SEM and design data, comprising a recipe generation section that generates an off-line recipe based on the input file for off-line recipe generation and the design data, a recipe editing section that edits the off-line recipe and generates an edited off-line recipe in accordance with an instruction, and a reflection processing section that reflects edits which have been made to the edited off-line recipe in the input file for off-line recipe generation and generates a changed input file for off-line recipe generation. The generated one of the off-line recipe and the edited offline recipe may be transferred to the critical dimension SEM.

According to another aspect of the present invention, there is provided a recipe generation system for generating a recipe of a critical dimension SEM off-line using an input file for off-line recipe generation for the critical dimension SEM and design data, comprising an optimal value generation section that generates an optimal value for a pictorial imaging condition in each of items included in the input file for off-line recipe generation based on information on a measurement point included in the input file for off-line recipe generation and the design data, and an optimal value reflection processing section that reflects the optimal value in the input file for off-line recipe generation and generates an input file having undergone optimal value setting in accordance with an instruction to reflect the optimal value in the input file for off-line recipe generation.

According to still another aspect of the present invention, there is provided a recipe generation system for generating a recipe of a critical dimension SEM off-line using an input file for off-line recipe generation for the critical dimension SEM and design data, comprising an optimal value generation section that generates an optimal value for a pictorial imaging condition in each of items included in the input file for off-line recipe generation based on information on a measurement point included in the input file for off-line recipe generation and the design data, and a recipe generation section that generates an off-line recipe based on the design data, the optimal value, and the input file for off-line recipe generation in accordance with an instruction to reflect the optimal value in an off-line recipe. The system according to the aspect may further comprise an optimal value reflection processing section that reflects the optimal value in the input file for off-line recipe generation and generates an input file having undergone optimal value setting, in accordance with an instruction to reflect the optimal value in the input file for off-line recipe generation. Alternatively, the system according to the aspect may further comprise a recipe editing section that edits the off-line recipe and generates an edited off-line recipe in accordance with an instruction, and an editing reflection processing section that reflects edits which have been made to the edited off-line recipe in the input file for off-line recipe generation and generates a changed input file for off-line recipe generation.

According to still another aspect of the present invention, there is provided a recipe generation system comprising an off-line recipe storage section that stores an existing off-line recipe for N (N is a positive integer) measurement points, an item setting section that sets an item for which an optimal value is to be generated for one of the measurement points selected in the existing off-line recipe, an optimal value generation section that generates an optimal value for a pictorial imaging condition for the item set by the item setting section, and a reflection processing section that reflects the optimal value in the selected one measurement point in the existing off-line recipe, wherein the optimal value generation and reflection processing are performed on each of all of the selected points in the existing off-line recipe. The system according to the aspect may further comprise an input file generation section that generates an input file for off-line recipe generation for a critical dimension SEM from the off-line recipe in which the optimal value is reflected in accordance with an instruction. Note that an off-line recipe generated through a GUI for off-line recipe generation may be used instead of the existing off-line recipe.

According to still another aspect of the present invention, there is provided a recipe generation system comprising a recipe selection section that acquires a recipe actually used in a critical dimension SEM, an input file generation section that generates an input file for off-line recipe generation based on the recipe in accordance with an instruction, and a recipe generation section that generates an off-line recipe based on the recipe in accordance with an instruction.

Note that the present invention also provides recipe generation methods corresponding to the above-described systems.

Further features of the present invention will be apparent from the best mode for carrying out the invention and the accompanying drawings below.

According to a recipe generation apparatus and method of the present invention, since a value obtained by optimizing an input file for recipe generation is automatically reflected in an input file for recipe generation, the time required to reflect an optimal value and changed value in the input file can be reduced.

DESCRIPTION OF SYMBOLS

Figure 1:
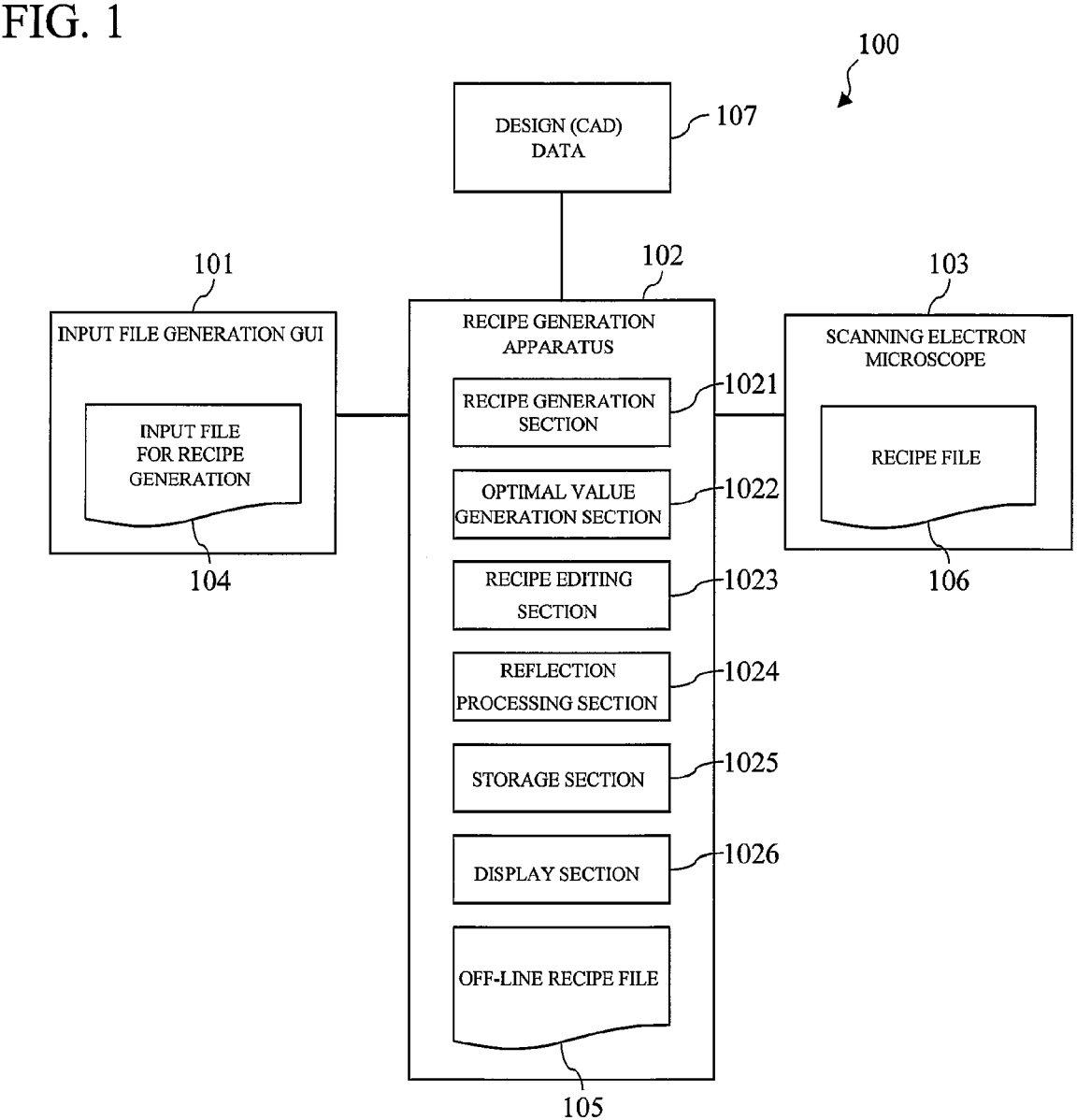
FIG. 1 is a block diagram showing the schematic configuration of an off-line recipe generation system 100 according to the present invention.

100 . . . off-line recipe generation system, 101 . . . input file generation GUI, 102 . . . recipe generation apparatus, 103 . . . scanning electron microscope, 104 . . . input file for recipe generation, 105 . . . off-line recipe file, 106 . . . recipe file, 201 . . . information necessary for one measurement, 202 . . . stage movement information, 203 . . . coordinate values (x, y), 204 . . . addressing information, 205 . . . coordinate values (x, y), 206 . . . magnification, 207 . . . auto-focus information (coordinate values (x, y) and magnification), 208 . . . auto-stigma information (coordinate values (x, y) and magnification), 209 . . . measurement point information, 210 . . . coordinate values (x, y), 211 . . . magnification, 212 . . . scanning direction, 213 . . . auto-focus information (coordinate values (x, y) and magnification), 214 . . . auto-stigma information (coordinate values (x, y) and magnification), 215 . . . coordinate values (x, y) for auto-brightness and auto-contrast, 216 . . . measurement type information, 217 . . . measurement type, 218 . . . measurement cursor information, 219 . . . parameter for measurement, 401 . . . measurement point coordinate values (x, y), 402 . . . addressing point, 403 . . . addressing point auto-focus, 404 . . . measurement point auto-focus, 601 . . . optimization item setting, 602 . . . check box, 603 . . . coordinate values for addressing, 604 . . . magnification for addressing, 605 . . . check box for reflection of an optimal value in an input file for recipe generation, 606 . . . check box for reflection of an optimal value in an off-line recipe

DETAILED DESCRIPTION OF THE PREFERRED EMBODIMENTS

Heretofore, users have performed the work of generating a recipe in front of an electron microscope while viewing an image of an actual wafer. If the number of measurement points is large, the length of time for which instrumentation is used for recipe generation increases, and the operating rate of the instrumentation decreases, which is a problem. An off-line recipe generation system according to the present invention solves the problem and is intended to generate a recipe using an input file for recipe generation and design data. The present invention is also intended to automatically reflect, in an input file for recipe generation, a value in a recipe changed or optimized by a user.

Embodiments of the present invention will be described below with reference to the accompanying drawings. Note that the embodiments are merely illustrative embodiments for realizing the present invention and are not intended to limit the technical scope of the present invention. Components common to the drawings are denoted by the same reference numerals.

First Embodiment (1) Configuration of Off-Line Recipe Generation System

FIG. 1 is a block diagram showing the schematic configuration of an off-line recipe generation system 100 which is applied to each embodiment of the present invention. As shown in FIG. 1, the off-line recipe generation system 100 includes an input file generation GUI 101 for generating an input file 104 for recipe generation serving as basic data from which an off-line recipe is to be generated, a recipe generation apparatus 102 which generates a recipe of a scanning electron microscope from the input file 104 for recipe generation off-line, a scanning electron microscope 103 which performs measurement using a generated recipe, and a design data storage section 107 storing design (e.g., CAD) data.

Figure 2:
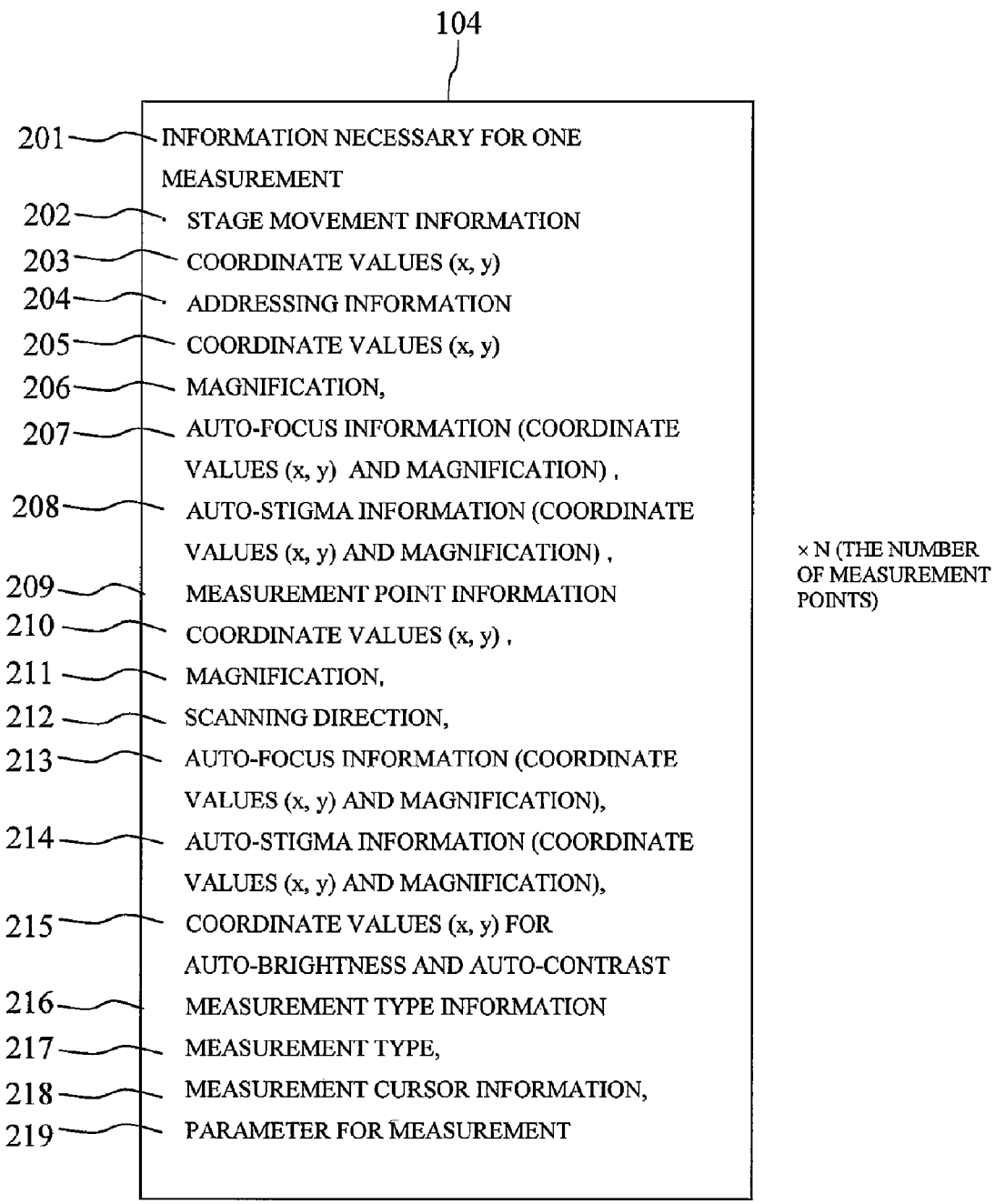
FIG. 2 shows the configuration of an input file for off-line recipe generation and is a chart showing information necessary for one measurement required to set a recipe file of a scanning electron microscope.

The input file generation GUI (input file generation section) 101 generates the input file 104 for recipe generation as shown in FIG. 2. The design data storage section 107 stores information indicating an external shape and structure such as CAD data obtained when an LSI formed of a semiconductor, a mask for semiconductor exposure, liquid crystals, and the like are designed.

The recipe generation apparatus 102 is an apparatus for generating an off-line recipe of the scanning electron microscope 103 and generates a recipe off-line using design data stored in the design data storage section 107 and the input file 104 for recipe generation.

The recipe generation apparatus 102 includes a recipe generation section 1021 which generates an off-line recipe from the input file 104 for recipe generation and design data, an optimal value generation section 1022 which sets each of values of a provisionally generated off-line recipe to an optimal value, a recipe editing section 1023 which allows editing of a provisionally generated off-line recipe, a reflection processing section 1024 which performs the process of reflecting the contents of an optimized recipe or edited recipe in the input file 104 for recipe generation, a storage section 1025 which stores a provisionally generated off-line recipe and various types of data and stores a program for performing processes to be described below, a display section 1026 which displays an off-line recipe and the like, and an off-line recipe file 105 which stores a finally generated off-line recipe.

Note that since the focus of the present invention lies in that a change is automatically reflected in the input file 104 for recipe generation using the input file generation GUI (input file generation section) 101 and recipe generation apparatus 102, a detailed description of a scanning electron microscope with a general configuration will be omitted.

Examples of means by which a user generates the off-line recipe file 105 on the recipe generation apparatus 102 include a method for generating a recipe by inputting the input file 104 for recipe generation and a method for generating a recipe on a screen (the display section 1026) of the recipe generation apparatus 102. In the latter case, if there are thousands of pieces of measurement information, it is necessary to set the pieces of measurement information by inputting or selecting a necessary value for each piece of measurement information on a screen, and the work takes considerable time. In contrast, the former case (the case where the input file 104 for recipe generation generated through the GUI 101 is inputted) requires only the work of editing a file, and it is possible to easily make a plurality of copies of information necessary for measurement or delete the information and change (edit) values. A recipe can be generated in a shorter time than the manual input through the GUI. For this reason, the method for generating a recipe from the input file 104 for recipe generation becomes more advantageous for a user with an increase in the number of measurement points to, e.g., hundreds.

(2) Example of Configuration of Input File for Recipe Generation

FIG. 2 shows an example of the configuration of the input file 104 for recipe generation. As described above, the input file 104 for recipe generation is generated through the input file generation GUI 101 in FIG. 1 and is a file for setting information for generating an off-line recipe. The input file 104 for recipe generation has N pieces of measurement information, provided that a piece 201 of information necessary for measurement in FIG. 2 is treated as one piece of measurement information. The piece 201 of information necessary for one measurement of the scanning electron microscope 103 is composed of, e.g., stage movement information 202, addressing information 204 necessary for reaching a measurement point, measurement point information 209, and information 216 on the type of a measurement to be performed at a measurement point (to be referred to as measurement type information).

The stage movement information 202 includes coordinate values (x, y) 203.

The addressing information 204 is composed of, e.g., addressing coordinate values (x, y) 205, a magnification 206 for addressing, coordinate values (x, y) and a magnification as auto-focus information 207 for addressing, and coordinate values (x, y) and a magnification as auto-stigma information 208 for addressing.

The measurement point information 209 is composed of, e.g., coordinate values (x, y) 210, a magnification 211 for a measurement point, a scanning direction 212 for a measurement point, coordinate values (x, y) and a magnification as auto-focus information 213 for a measurement point, and coordinate values (x, y) and a magnification as auto-stigma information 214 for a measurement point.

The measurement type information 216 is information for performing measurement at a measurement point and is composed of, e.g., a measurement type 217, measurement cursor information 218, and a parameter 219 for measurement.

Note that a user needs to generate N "pieces 201 of information necessary for one measurement" in the input file 104 for recipe generation to generate a recipe for performing measurement at N measurement points.

(3) Process of Generating Recipe and Automatically Reflecting Change Etc.

Figure 3:
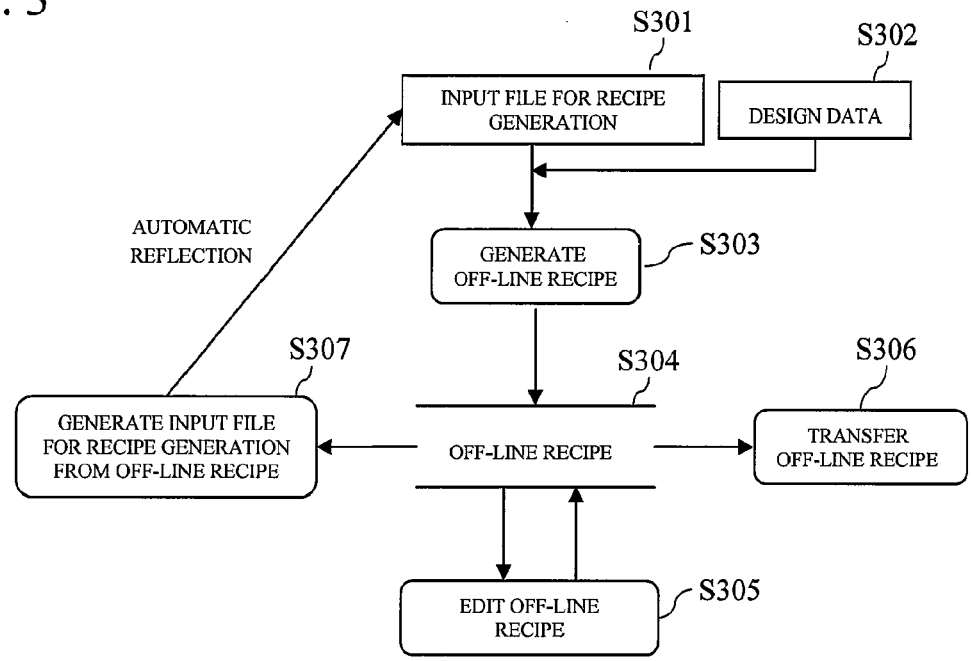
FIG. 3 is a sequence diagram for explaining an off-line recipe generation process and a changed value reflection process according to a first embodiment.

FIG. 3 is a sequence diagram for explaining the process of generating an off-line recipe using the input file 104 for recipe generation generated through the input file generation GUI 101 according to the first embodiment.

In step S301, the input file 104 for recipe generation generated through the input file generation GUI 101 is prepared and is inputted to the recipe generation apparatus 102. In step S302, design data (with an ideal shape) corresponding to a pattern to be formed on a wafer in the electron microscope 103 is prepared and is inputted to the recipe generation apparatus 102.

In step S303, the recipe generation section 1021 reflects the contents of the input file 104 for recipe generation in the design data and generates an off-line recipe. For example, the recipe generation section 1021 displays the design data at a magnification specified by the input file 104 and superimposes the measurement type 217, measurement cursor information 218, and the like on the design data. This processing is performed for each of N measurement points, thereby provisionally generating the off-line recipe based on the input file 104. In step S304, the provisionally generated off-line recipe is displayed on the display section 1026 and is stored in the storage section 1025.

Note that since the generated off-line recipe is not always a recipe available to the scanning electron microscope 103, an information change, deletion, or the like may be made. For this reason, it is possible to make an information deletion, change, addition, or the like to the provisionally generated off-line recipe using the recipe editing section 1023 in step S305, as needed. Examples of the information handling include changing a magnification, changing a scanning direction, and changing the coordinates of a measurement point.

In step S306, the generated off-line recipe (completed recipe) is stored in the off-line recipe file 105 and is transferred to the scanning electron microscope 103. The completed and transferred off-line recipe is added to a recipe file 106 of the scanning electron microscope 103 and is made available for actual measurement.

In step S307, if a change or the like is made to the off-line recipe generated from the input file 104 in step S305, the reflection processing section 1024 automatically reflects the change in the input file 104 for recipe generation prepared in step S301. More specifically, the reflection processing section 1024 holds the details of processing such as change performed in step S305, compares the contents of the file shown in FIG. 2 with the details, and rewrites a part to be changed. This processing is performed for each of the N measurement points.

(4) Advantages

If a user generates a new off-line recipe (S304) from scratch instead of editing a proven recipe, since adjustment of values shown in FIG. 2 is necessary, the user needs to perform off-line recipe editing (S305). If off-line recipe editing (S305) is performed, the pieces of information shown in FIG. 2 of the off-line recipe before the editing are different from those after the editing. To generate an off-line recipe identical to the off-line recipe after the editing from the input file 104 for recipe generation, the same editing processing needs to be performed if edits are not reflected in the file 104 for recipe generation.

As a conventional method for reflecting edits in the input file for recipe generation, there is available to a user the process of writing down values changed by editing in the input file generation GUI 101 of FIG. 1 on memo paper or the like and reflecting the values one by one in the input file for recipe generation. If there are hundreds of pieces 201 of information necessary for one measurement in FIG. 2, it is virtually impossible to reflect all of changed values in the input file 104 for recipe generation without omission.

For this reason, the present invention is configured to automatically reflect edits in the input file 104 for recipe generation. As automatic reflection means, a button for automatic generation of an input file for recipe generation from an off-line recipe is provided on a screen where the off-line recipe editing (S305) is performed by a user. When a user presses the button, generation of the input file for recipe generation from the off-line recipe is performed (S307), the input file 104 for recipe generation, in which values in an off-line recipe after editing are reflected, is automatically generated.

Second Embodiment

A system according to a second embodiment has the same configuration as the system 100 in FIG. 1 but is different in that the system is capable of automatically generating an optimal value without a user's inputting a setup value in an input file 104 for recipe generation and automatically reflecting the automatically generated optimal value in the input file 104 for recipe generation.

Figure 4:
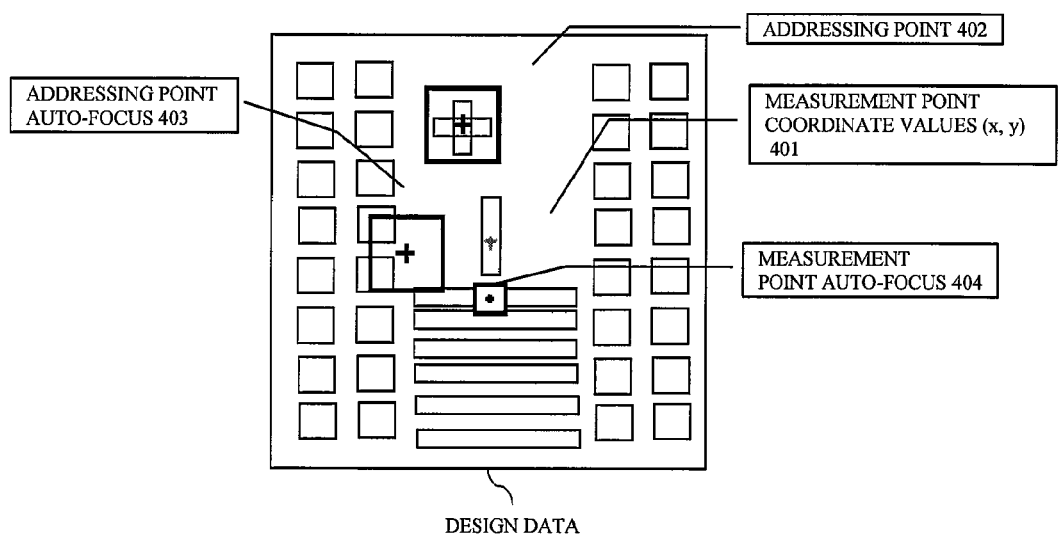
FIG. 4 is a view showing an example of coordinate values to be automatically generated from coordinate values of a measurement point in off-line recipe generation according to a second embodiment.

In this embodiment, when an off-line recipe is generated from the input file 104 for recipe generation, an optimal value is automatically generated. FIG. 4 is a view for explaining the process of automatically setting information on a measurement point on design data. An example of coordinate values to be automatically generated will be described with reference to FIG. 4.

(1) Concept of Automatic Setting of Optimal Value

Assume here that a user has inputted only measurement point coordinate values (x, y) 401 in the input file 104 for recipe generation. The external shape and structure information (as an alternative to a SEM image) of the vicinity of the measurement point coordinate values (x, y) 401 is generated from design data. A unique pattern dissimilar to other patterns is extracted using the information, and the extracted unique pattern is automatically set as an optimal addressing point 402. Similarly, addressing point auto-focus information 403 and measurement point auto-focus information 404 are automatically generated in consideration of a beam scanning direction and an optimal distance from a measurement point. Other items are automatically generated as needed. If there are a plurality of measurement points, the above-described automatic optimal value generation is repeated for each of the measurement points, thereby generating an off-line recipe.

(2) Recipe Generation Process and Process of Automatically Reflecting Optimal Value, Changed Value, Etc.

Figure 5:
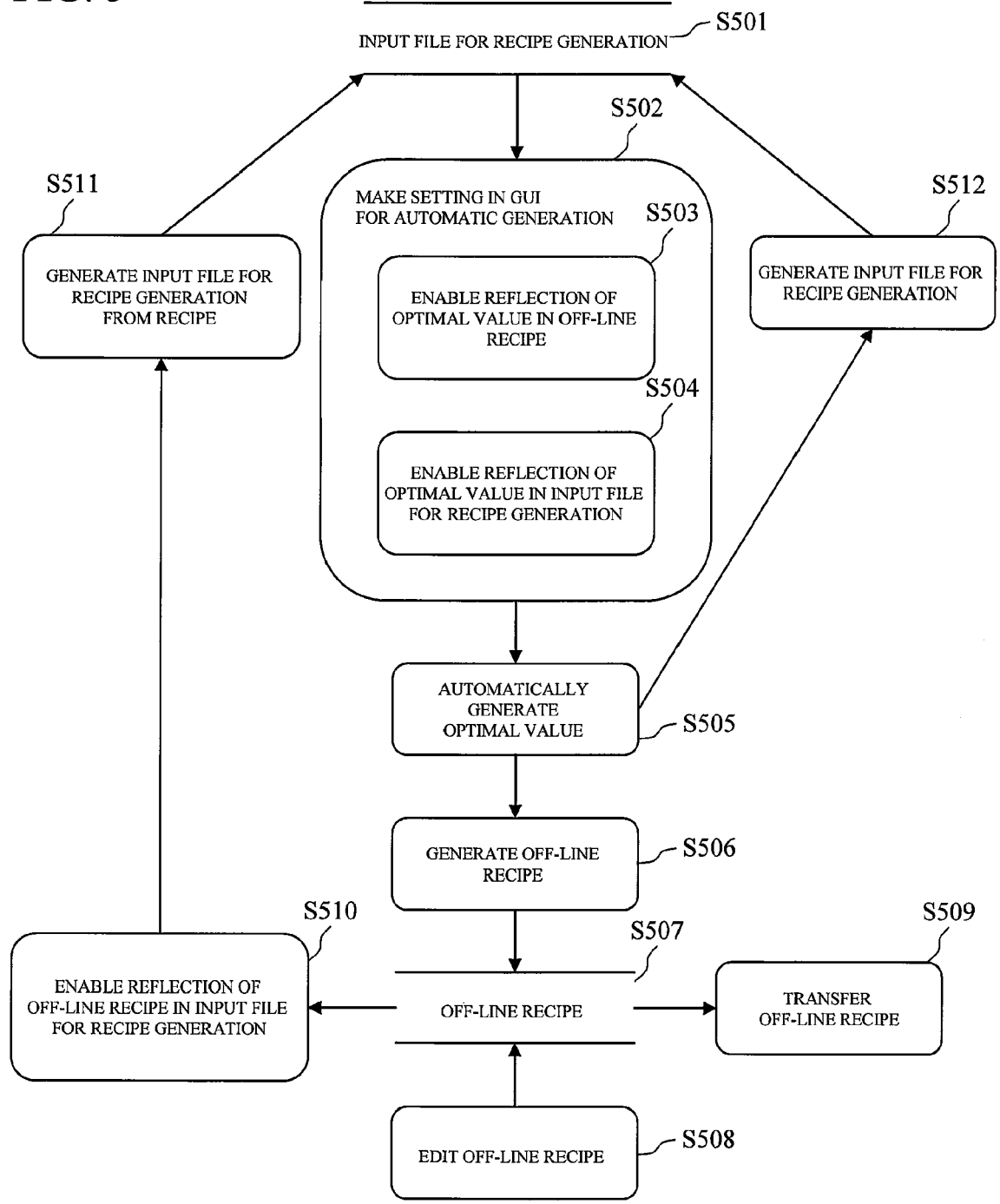
FIG. 5 is a sequence diagram for explaining an off-line recipe generation process and an optimal value reflection process according to the second embodiment.

FIG. 5 is a sequence diagram for explaining an off-line recipe generation process and the process of automatically reflecting an optimal value, changed value, and the like according to the second embodiment.

In step S501, the input file 104 for recipe generation generated by a user is inputted. An item for which automatic generation can be performed may not be set in the input file. The minimum required information is information on measurement point coordinate values described above. The system is configured to be capable of automatically generating an optimal value even if all items are inputted.

Figure 6:
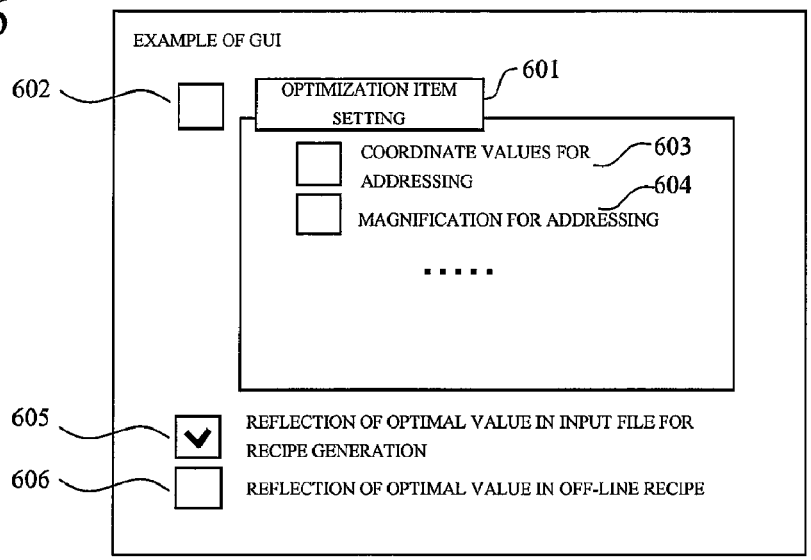
FIG. 6 is a view showing an example of a GUI for automatic generation.

In step S502, which process to perform as an automatic reflection process is specified by a user using a GUI for automatic generation. An example of a GUI screen is as shown in FIG. 6. Optimization item setting 601 makes it possible to set individual items for which optimization is to be performed. Values, such as addressing coordinate values 603 and an addressing magnification 604, denoted by reference numerals 201 to 219 in FIG. 2 can be set in the optimization item setting 601. If a check box 602 for the optimization item setting is checked, an optimal value for a checked item is automatically generated. Since an optimal value is not automatically generated for an unchecked item, a value in the input file 104 for recipe generation inputted in step S501 is valid. Whether to reflect an optimal value in an off-line recipe and whether to reflect an optimal value in the input file for recipe generation can be respectively specified by checking or unchecking a check box 605 for reflection of an optimal value in an input file for recipe generation and a check box 606 for reflection of an optimal value in an off-line recipe.

In step S505, after the setting through the GUI, an optimal value generation section 1022 automatically generates optimal values for the input file 104 for recipe generation with reference to design data. For example, the optimal value generation section 1022 places the measurement point 401 on the design data, finds a unique pattern in the vicinity of the measurement point 401, and sets the unique pattern as the addressing point 402. The optimal value generation section 1022 also sets pairs 403 and 404 of coordinate information and magnification information which are respectively available for auto-focus processing for the addressing point and auto-focus processing for the measurement point, in the vicinity of the measurement point 401.

In step S512, if the check box 605 is set to ON, the optimal value generation section 1022 reflects the obtained optimal values for corresponding items of the input file 104 for recipe generation.

If the check box 606 is set to ON, the process advances to step S506. In step S506, a recipe generation section 1021 reflects the contents of the input file 104 for recipe generation, in which the optimal values are set, in the design data and generates an off-line recipe. For example, the recipe generation section 1021 displays the design data at a magnification specified in the input file 104 and superimposes a measurement type 217, measurement cursor information 218, and the like on the design data. This processing is performed for each of N measurement points, thereby provisionally generating the off-line recipe based on the input file 104. In step S507, the provisionally generated off-line recipe is displayed on a display section 1026 and is stored in a storage section 1025.

Note that if only the input file for recipe generation is necessary, only the check box 605 for reflection of an optimal value in an off-line recipe may be checked in the GUI (FIG. 6), only the automatic reflection of the automatically generated optimal values in the input file for recipe generation (step S512) may be performed, and the generation of the off-line recipe (step S506) may be skipped. This reduces the time required to generate an input file for recipe generation.

Since the off-line recipe stored in the storage section 1025 in step S507 is not always a recipe available to a scanning electron microscope 103, an information change, deletion, or the like may be made. For this reason, it is possible to make an information deletion, change, addition, or the like to the provisionally generated off-line recipe using a recipe editing section 1023 in step S508, as needed. Examples of the information handling include changing a magnification, changing a scanning direction, and changing the coordinates of a measurement point.

In step S509, the generated off-line recipe (completed recipe) is stored in an off-line recipe file 105 and is transferred to the scanning electron microscope 103. The completed and transferred off-line recipe is added to a recipe file 106 of the scanning electron microscope 103 and is made available for actual measurement.

In step S510, a reflection processing section 1024 automatically reflects the optimal values and a change in the input file 104 for recipe generation. More specifically, the reflection processing section 1024 holds the details of processing such as change performed in step S508 and the optimal values set in step S505, compares the contents of the file shown in FIG. 2 with the details and optimal values, and rewrites a part to be changed. This processing is performed for each of the N measurement points.

As described above, according to this embodiment, since a user automatically sets an optimal value without inputting a setup value, it is possible to significantly reduce recipe generation time. For example, assume that a file for recipe generation in which no addressing information is set is generated. Also assume that, in the setting through the GUI for automatic generation (S502), reflection of an optimal value in an input file for recipe generation is enabled (S504), and reflection of an automatically generated optimal value in an off-line recipe is enabled (S503). According to this specification pattern, an optimal value is automatically generated, the automatically generated optimal value is reflected in the input file for recipe generation, and the optimal value and a change are automatically reflected in the input file for recipe generation.

Third Embodiment

Figure 7:
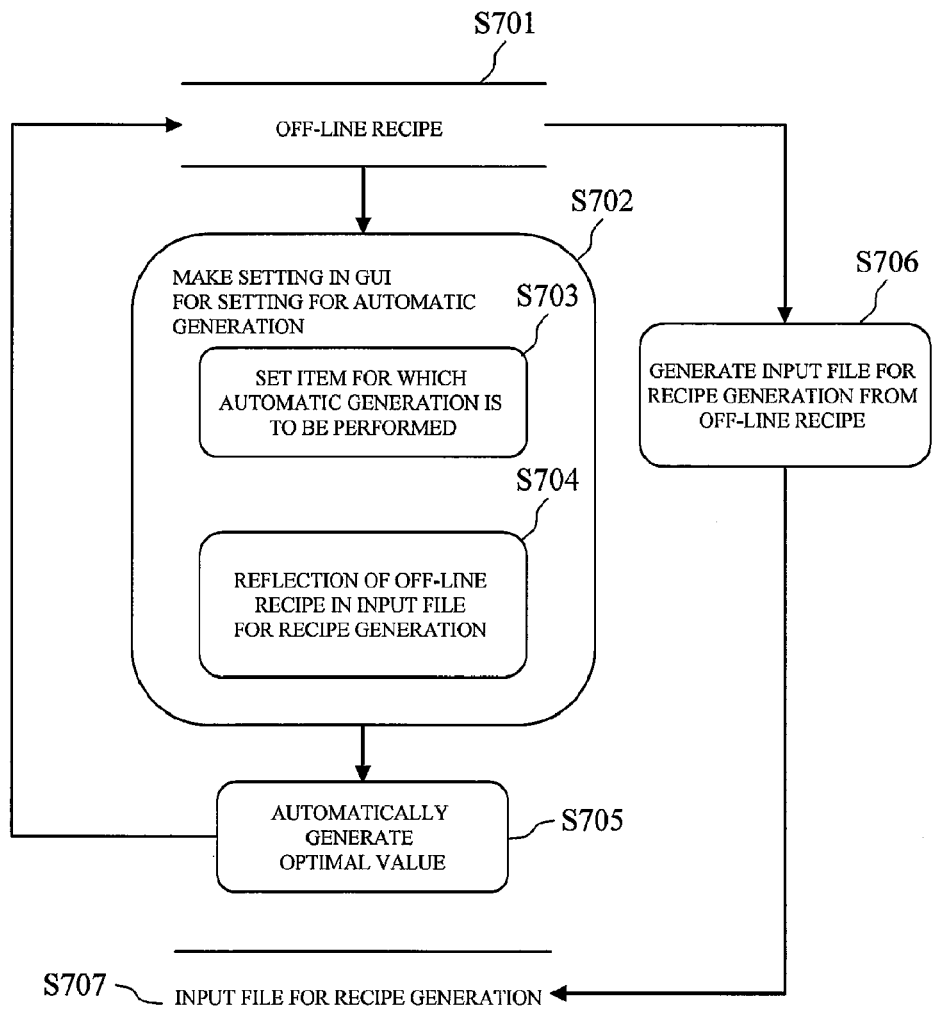
FIG. 7 is a sequence diagram for explaining an off-line recipe generation process and an optimal value reflection process according to a third embodiment.

A third embodiment relates to the process of selecting an item for which an optimal value is to be automatically generated for each of pieces of information necessary for one measurement after generating an off-line recipe, automatically generating optimal values, and reflecting the off-line recipe in which the optimal values are reflected in an input file for recipe generation. FIG. 7 is a sequence diagram for explaining such as a process according to the third embodiment.

In step S701, an off-line recipe is prepared. For example, the off-line recipe generated in the first or second embodiment is prepared. Of the off-line recipe, information on one measurement point is selected.

In step S702, an item for which automatic generation is to be performed is set and is inputted by a user. More specifically, an item for which automatic generation is to be performed is set in step S703, and whether to enable reflection in an input file for recipe generation is set in step S704. Items for which automatic generation can be performed are same as those in the optimization item setting 601 in FIG. 6. If a value of the item for which automatic generation has been performed is desired to be reflected in the input file for recipe generation (S706), reflection of an off-line recipe in an input file for recipe generation is enabled (S704).

In step S705, an optimal value generation section 1022 automatically generates an optimal value, and a recipe generation section 1021 generates the off-line recipe. The process of generating an optimal value and the process of generating an off-line recipe are the same as those in the first and second embodiments, and a description thereof will be omitted.

The process returns to step S701 to select information on the next measurement point. When the optimal value generation process is completed for all or necessary ones of measurement points, the process shifts to step S706. In step S706, the input file for recipe generation in the format shown in FIG. 2 is generated from the off-line recipe in which the optimal value is reflected.

In step S707, the input file for recipe generation generated in step S706 is stored in a storage section 1025. Note that the input file for recipe generation may be transferred to an input file generation GUI 101.

As described above, according to this embodiment, it is possible to automatically generate an input file for recipe generation from an off-line recipe in which an optimal value is reflected.

Fourth Embodiment

A fourth embodiment relates to an example in which a user does not manually generate an input file for recipe generation and automatically generates an input file for recipe generation from an existing off-line recipe.

A recipe is generated through a GUI (not shown) of a recipe generation apparatus 102 or an already generated off-line recipe is selected from an off-line recipe file 105. For example, assume that a button for reflection of an off-line recipe in an input file for recipe generation for an off-line recipe is present on a GUI screen for off-line recipe generation. It is possible to automatically generate an input file for recipe generation from a selected off-line recipe by pressing the button. The process corresponds to the processes in steps S701, S706, and S707 in FIG. 7. Note that, in this embodiment, it is possible to select a plurality of off-line recipes which can each be converted into an input file for recipe generation and individually input names for the input files for recipe generation to be generated.

Fifth Embodiment

Figure 8:
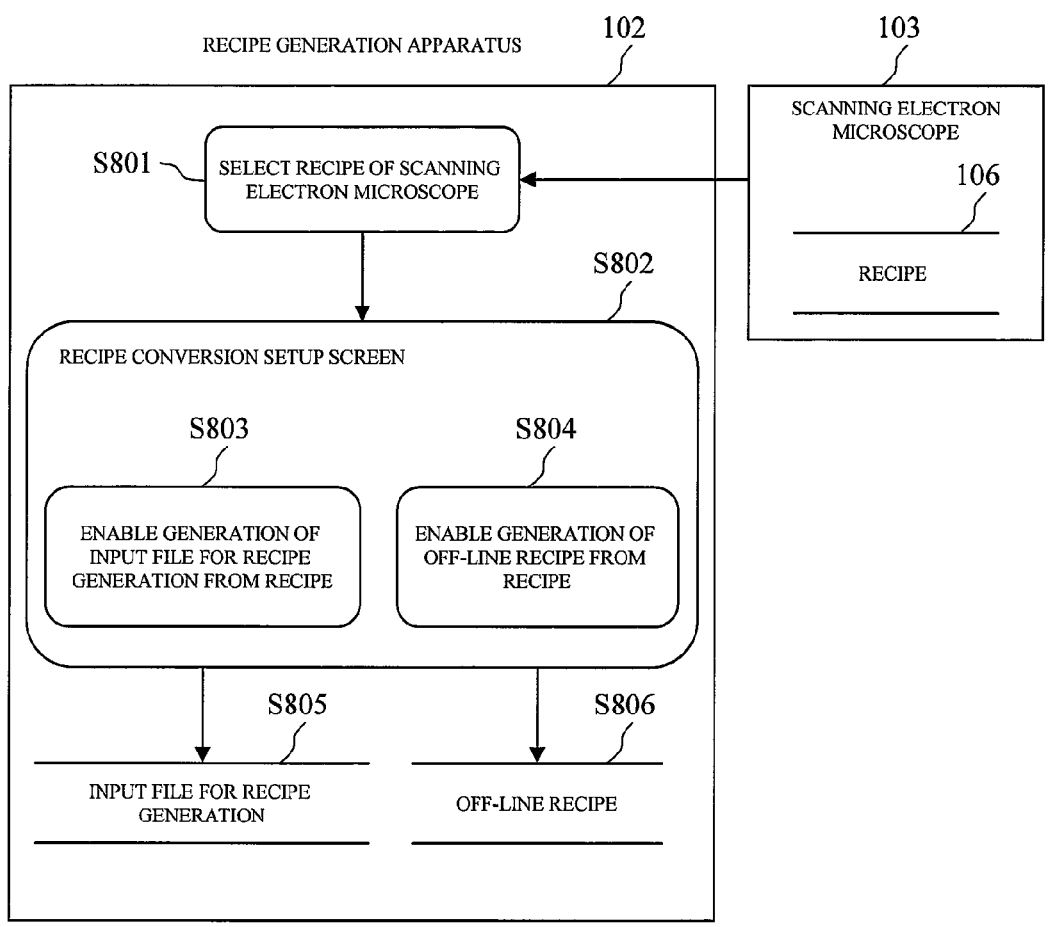
FIG. 8 is a sequence diagram for explaining a process according to a fifth embodiment, the process of generating an off-line recipe file and an input file for recipe generation from a recipe of a scanning electron microscope.

A fifth embodiment relates to an example in which an off-line recipe file and an input file for recipe generation are generated on the basis of a recipe from a scanning electron microscope. FIG. 8 is a sequence diagram for explaining such a process according to the fifth embodiment.

A recipe generation apparatus 102 is configured to be capable of selecting a recipe stored in a recipe storage section 106 in a scanning electron microscope 103 and displaying the recipe on a display section 1026 or selecting and editing a recipe.

In step S801, a recipe of the scanning electron microscope 103 is selected by the recipe generation apparatus 102 in accordance with an instruction from a user.

In step S802, which file to generate from the recipe selected in step S801 is set on a recipe conversion setup screen displayed on the display section 1026. More specifically, generation of an input file for recipe generation from a recipe is enabled if an input file for recipe generation is necessary (step S803) while generation of an off-line recipe from a recipe is enabled if an off-line recipe is necessary (step S804). If both an input file for recipe generation and an off-line recipe are necessary, both the settings are enabled.

In step S805, a reflection processing section 1024 generates an input file for recipe generation in a format shown in FIG. 2 from a recipe used in an actual scanning electron microscope. In step S806, the recipe used in the actual scanning electron microscope is converted into coordinate values of design data (CAD data), thereby generating an off-line recipe.

This function eliminates the need to generate an off-line recipe and an input file for recipe generation with the recipe generation apparatus 102 and significantly reduces the time required to generate an off-line recipe.

[Application]

A user can cause a generated input file for recipe generation to be shared, as a common file from which a high-precision off-line recipe having undergone user adjustment can be generated, among a plurality of recipe generation apparatuses 102-1 to 102-3.

Figure 9:
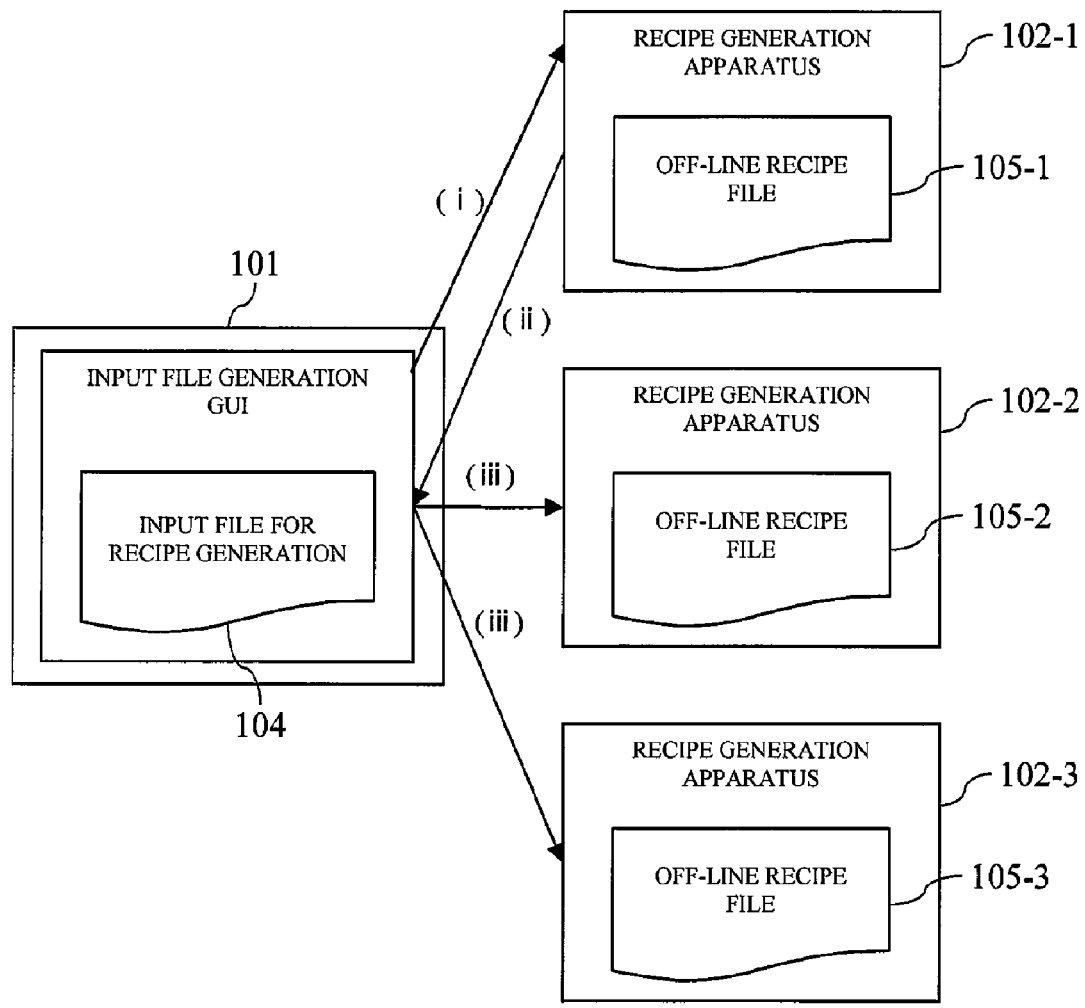
FIG. 9 is a diagram showing a topology (an application) which shares an input file for recipe generation among a plurality of recipe generation systems.

FIG. 9 is a diagram showing a topology which shares such an input file for recipe generation. A PC provided with the input file generation GUI 101 is connected to the plurality of recipe generation apparatuses 102-1 to 102-3 for scanning electron microscopes. First, (i) an input file for recipe generation is inputted to the recipe generation apparatus 102-1. In the recipe generation apparatus 102-1, a new input file for recipe generation is generated on the basis of an off-line file generated according to any of the first to fifth embodiments.

(ii) Copies of the new input file are then supplied to the input file generation GUI 101. (iii) The copies of the new input file are provided to the other recipe generation apparatuses 102-2 and 102-3, and off-line recipes are generated and are stored in off-line recipe file storage sections 105-2 and 105-3, respectively. Accordingly, the recipe generation apparatuses 102-2 and 102-3 are capable of generating a high-precision off-line recipe in a short time.

Other Embodiments

The present invention can also be realized by the program codes of software for realizing the functions of the embodiments. In this case, a storage medium storing the program codes is provided to a system or apparatus, and a computer (or a CPU or MPU) of the system or apparatus reads out the program codes stored in the storage medium. The program codes themselves read out from the storage medium realize the functions of the above-described embodiments, and the program codes themselves and the storage medium storing the program codes constitute the present invention. Examples of such a storage medium for supplying program codes include a floppy (registered trademark) disk, CD-ROM, DVD-ROM, hard disk, optical disk, magneto-optical disk, CD-R, magnetic tape, nonvolatile memory card, and ROM.

The functions of the embodiments may be realized when an OS (Operating System) or the like running on a computer performs part or all of actual processing in accordance with program codes. The functions of the embodiments may also be realized when, after program codes read out from a storage medium are written in a memory of a computer, a CPU or the like of the computer performs part or all of actual processing in accordance with the program codes.

The functions of the embodiments may be further realized when program codes of software for realizing the functions of the embodiments are distributed over a network and are stored in storage means such as a hard disk or memory of a system or apparatus or a storage medium such as a CD-RW or CD-R, and a computer (or a CPU or MPU) of the system or apparatus reads out and execute the program codes stored in the storage means or storage medium.

What is claimed is:

1. A non-transitory computer-readable medium encoded with a computer program for generating a recipe of a critical dimension SEM off-line using an input file for off-line recipe generation for the critical dimension SEM and design data, the computer program comprising instructions for:
    generating an off-line recipe based on the input file for off-line recipe generation and the design data;
    editing the off-line recipe and generating an edited off-line recipe in accordance with an instruction; and
    reflecting edits which have been made to the edited off-line recipe in the input file for off-line recipe generation and generating a changed input file for off-line recipe generation.

2. The non-transitory computer-readable medium according to claim 1, further comprising a recipe transfer section that transfers one of the off-line recipe and the edited off-line recipe to the critical dimension SEM.

3. A non-transitory computer-readable medium encoded with a computer program for generating a recipe of a critical dimension SEM off-line using an input file for off-line recipe generation for the critical dimension SEM and design data, the computer program comprising instructions for:
    generating an optimal value for a pictorial imaging condition in each of items included in the input file for off-line recipe generation based on information on a measurement point included in the input file for off-line recipe generation and the design data; and reflecting the optimal value in the input file for off-line recipe generation and generating an input file having undergone optimal value setting in accordance with an instruction to reflect the optimal value in the input file for off-line recipe generation.

4. A non-transitory computer-readable medium encoded with a computer program for generating a recipe of a critical dimension SEM off-line using an input file for off-line recipe generation for the critical dimension SEM and design data, the computer program comprising instructions for:

generating an optimal value for a pictorial imaging condition in each of items included in the input file for off-line recipe generation based on information on a measurement point included in the input file for off-line recipe generation and the design data; and generating an off-line recipe based on the design data, the optimal value, and the input file for off-line recipe generation in accordance with an instruction to reflect the optimal value in an off-line recipe.

5. The computer-readable medium according to claim 4, the computer program further comprising an instruction for reflecting the optimal value in the input file for off-line recipe generation and generating an input file having undergone optimal value setting, in accordance with an instruction to reflect the optimal value in the input file for off-line recipe generation.

6. The computer-readable medium according to claim 4, the computer program further comprising instructions for:
editing the off-line recipe and generating an edited off-line recipe in accordance with an instruction; and
reflecting edits which have been made to the edited off-line recipe in the input file for off-line recipe generation and generating a changed input file for off-line recipe generation.

7. A non-transitory computer-readable medium encoded with a computer program for recipe generation, the computer program comprising instructions for:
storing an existing off-line recipe for N (N is a positive integer) measurement points;
setting an item for which an optimal value is to be generated for one of the measurement points selected in the existing off-line recipe;
generating an optimal value for a pictorial imaging condition for the item set by the item setting section instruction; and
reflecting the optimal value in the selected one measurement point in the existing off-line recipe, wherein
the optimal value generation and reflection processing are performed on each of all of the selected points in the existing off-line recipe.

8. The computer-readable medium according to claim 7, the computer program further comprising an instruction for generating an input file for off-line recipe generation for a critical dimension SEM from the off-line recipe in which the optimal value is reflected in accordance with an instruction.

9. The computer-readable medium according to claim 7, wherein an off-line recipe generated through a GUI for off-line recipe generation is used instead of the existing off-line recipe.

10. A computer-readable medium encoded with a computer program for recipe generation, the computer program comprising instructions for:
acquiring a recipe actually used in a critical dimension SEM;
generating an input file for off-line recipe generation based on the recipe in accordance with an instruction; and
generating an off-line recipe based on the recipe in accordance with an instruction.

11. A recipe generation method for generating a recipe of a critical dimension SEM off-line using an input file for off-line recipe generation for the critical dimension SEM and design data, comprising:
a step of, by a recipe generation section, generating an off-line recipe based on the input file for off-line recipe generation and the design data;
a step of, by a recipe editing section, editing the off-line recipe and generating an edited off-line recipe in accordance with an instruction; and
a step of, by a reflection processing section, reflecting edits which have been made to the edited off-line recipe in the input file for off-line recipe generation and generating a changed input file for off-line recipe generation.

12. The recipe generation method according to claim 11, further comprising a step of, by a transfer section, transferring one of the off-line recipe and the edited off-line recipe to the critical dimension SEM.

13. A recipe generation method for generating a recipe of a critical dimension SEM off-line using an input file for off-line recipe generation for the critical dimension SEM and design data, comprising:
a step of, by an optimal value generation section, generating an optimal value for a pictorial imaging condition in each of items included in the input file for off-line recipe generation based on information on a measurement point included in the input file for off-line recipe generation and the design data; and
a step of, by an optimal value reflection processing section, reflecting the optimal value in the input file for off-line recipe generation and generating an input file having undergone optimal value setting in accordance with an instruction to reflect the optimal value in the input file for off-line recipe generation.

14. A recipe generation method for generating a recipe of a critical dimension SEM off-line using an input file for off-line recipe generation for the critical dimension SEM and design data, comprising:
a step of, by an optimal value generation section, generating an optimal value for a pictorial imaging condition in each of items included in the input file for off-line recipe generation based on information on a measurement point included in the input file for off-line recipe generation and the design data; and
a step of, by a recipe generation section, generating an off-line recipe based on the design data, the optimal value, and the input file for off-line recipe generation in accordance with an instruction to reflect the optimal value in an off-line recipe.

15. The recipe generation method according to claim 14, further comprising a step of, by an optimal value reflection processing section, reflecting the optimal value in the input file for off-line recipe generation and generating an input file having undergone optimal value setting, in accordance with an instruction to reflect the optimal value in the input file for off-line recipe generation.

16. The recipe generation method according to claim 14, further comprising:
a step of, by a recipe editing section, editing the off-line recipe and generating an edited off-line recipe in accordance with an instruction; and
a step of, by an editing reflection processing section, reflecting edits which have been made to the edited off-line recipe in the input file for off-line recipe generation and generating a changed input file for off-line recipe generation.

17. A recipe generation method comprising:
a step of, by an item setting section, generating an optimal value at one of N (N is a positive integer) measurement points selected in an existing off-line recipe for the N measurement points, in accordance with an instruction;
a step of, by an optimal value generation section, generating an optimal value for a pictorial imaging condition for the item set by the item setting section; and
a step of, by a reflection processing section, reflecting the optimal value in the selected one measurement point in the existing off-line recipe, wherein
the optimal value generation and reflection processing are performed on each of all of the selected points in the existing off-line recipe.

18. The recipe generation system according to claim 17, further comprising a step of, by an input file generation section, generating an input file for off-line recipe generation for a critical dimension SEM from the off-line recipe in which the optimal value is reflected in accordance with an instruction.

19. The recipe generation system according to claim 17, wherein an off-line recipe generated through a GUI for off-line recipe generation is used instead of the existing off-line recipe.

20. A recipe generation method comprising:
a step of, by a recipe selection section, acquiring a recipe actually used in a critical dimension SEM;
a step of, by an input file generation section, generating an input file for off-line recipe generation based on the recipe in accordance with an instruction; and
a step of, by a recipe generation section, generating an off-line recipe based on the recipe in accordance with an instruction.

* * * * *